(12) United States Patent
Schleicher et al.

(10) Patent No.: US 7,816,299 B2
(45) Date of Patent: Oct. 19, 2010

(54) HYDROTREATING CATALYST SYSTEM SUITABLE FOR USE IN HYDROTREATING HYDROCARBONACEOUS FEEDSTREAMS

(75) Inventors: Gary P. Schleicher, Milford, NJ (US); Kenneth L. Riley, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 12/384,076

(22) Filed: Mar. 31, 2009

(65) Prior Publication Data

US 2010/0029474 A1 Feb. 4, 2010

Related U.S. Application Data

(63) Continuation-in-part of application No. 10/949,513, filed on Sep. 24, 2004, now abandoned.

(60) Provisional application No. 60/518,739, filed on Nov. 10, 2003, provisional application No. 60/608,448, filed on Sep. 9, 2004.

(51) Int. Cl.
*B01J 21/00* (2006.01)
*B01J 23/00* (2006.01)
*B01J 20/00* (2006.01)
*B01J 29/00* (2006.01)
*B01J 37/00* (2006.01)

(52) U.S. Cl. .......... 502/255; 502/259; 502/260; 502/263; 502/308; 502/309; 502/313; 502/314; 502/315; 502/316; 502/321; 502/322; 502/323; 502/326; 502/327; 502/332; 502/335; 502/336; 502/337; 502/338; 502/349; 502/350; 502/351; 502/355; 502/407; 502/415; 502/439; 502/527.12; 502/527.13

(58) Field of Classification Search .......... 502/242, 502/254, 255, 259, 260, 263, 308, 309, 313, 502/314, 315, 316, 321, 322, 323, 326, 327, 502/332, 335, 336, 337, 338, 349, 350, 351, 502/355, 407, 415, 439, 527.12, 527.13
See application file for complete search history.

(56) References Cited

U.S. PATENT DOCUMENTS

| | | | | |
|---|---|---|---|---|
| 4,019,976 A | * | 4/1977 | Cosyns et al. | 208/57 |
| 4,145,276 A | * | 3/1979 | Cosyns et al. | 208/57 |
| 4,181,602 A | * | 1/1980 | Quick et al. | 208/216 PP |
| 4,188,284 A | * | 2/1980 | Quick et al. | 208/216 PP |
| 4,191,635 A | * | 3/1980 | Quick et al. | 208/89 |
| 4,211,634 A | * | 7/1980 | Bertolacini et al. | 208/59 |
| 4,225,421 A | * | 9/1980 | Hensley et al. | 208/216 PP |
| 4,397,827 A | * | 8/1983 | Chu | 423/705 |
| 4,431,525 A | * | 2/1984 | Hensley et al. | 208/210 |
| 4,440,871 A | * | 4/1984 | Lok et al. | 502/214 |
| 4,572,778 A | * | 2/1986 | Ward | 208/89 |
| 4,585,747 A | * | 4/1986 | Valyocsik | 502/62 |
| 4,642,179 A | * | 2/1987 | Morales et al. | 208/217 |

(Continued)

*Primary Examiner*—Cam N Nguyen
(74) *Attorney, Agent, or Firm*—Robert A Migliorini

(57) ABSTRACT

A stacked bed catalyst system comprising at least one first catalyst selected from conventional hydrotreating catalyst having an average pore diameter of greater than about 10 nm and at least one second catalyst comprising a bulk metal hydrotreating catalyst comprised of at least one Group VIII non-noble metal and at least one Group VIB metal and optionally a binder material.

12 Claims, 1 Drawing Sheet

U.S. PATENT DOCUMENTS

| | | | | |
|---|---|---|---|---|
| 4,657,663 A | * | 4/1987 | Gardner et al. | 208/210 |
| 4,686,030 A | * | 8/1987 | Ward | 208/216 PP |
| 4,695,365 A | * | 9/1987 | Ackelson et al. | 208/89 |
| 4,776,945 A | * | 10/1988 | Washecheck et al. | 208/89 |
| 4,855,037 A | * | 8/1989 | Murakami et al. | 208/422 |
| 4,900,707 A | * | 2/1990 | Cody et al. | 502/230 |
| 4,902,404 A | * | 2/1990 | Ho | 208/57 |
| 4,925,554 A | * | 5/1990 | Sato et al. | 208/210 |
| 4,975,177 A | * | 12/1990 | Garwood et al. | 208/27 |
| 5,068,025 A | * | 11/1991 | Bhan | 208/57 |
| 5,075,269 A | * | 12/1991 | Degnan et al. | 502/77 |
| 5,100,855 A | * | 3/1992 | Clark et al. | 502/211 |
| 5,116,484 A | * | 5/1992 | Smegal | 208/254 H |
| 5,232,578 A | * | 8/1993 | Gillespie | 208/59 |
| 5,246,566 A | * | 9/1993 | Miller | 208/27 |
| 5,282,958 A | * | 2/1994 | Santilli et al. | 208/111.15 |
| 5,474,670 A | * | 12/1995 | Daage et al. | 208/210 |
| 5,624,547 A | * | 4/1997 | Sudhakar et al. | 208/89 |
| 5,888,380 A | * | 3/1999 | Fujita et al. | 208/251 H |
| 5,976,354 A | * | 11/1999 | Powers et al. | 208/89 |
| 6,096,189 A | * | 8/2000 | Cody et al. | 208/87 |
| 6,162,350 A | * | 12/2000 | Soled et al. | 208/113 |
| 6,290,841 B1 | * | 9/2001 | Gabrielov et al. | 208/213 |
| 6,294,077 B1 | * | 9/2001 | Dougherty et al. | 208/27 |
| 6,303,534 B1 | * | 10/2001 | Strohmaier et al. | 502/214 |
| 6,310,265 B1 | * | 10/2001 | Chester et al. | 585/739 |
| 6,383,366 B1 | * | 5/2002 | Riley et al. | 208/137 |
| 6,582,590 B1 | * | 6/2003 | Riley et al. | 208/210 |
| 6,620,313 B1 | * | 9/2003 | Demmin et al. | 208/112 |
| 6,758,963 B1 | * | 7/2004 | Hantzer et al. | 208/213 |
| 6,863,803 B1 | * | 3/2005 | Riley et al. | 208/213 |
| 7,232,515 B1 | * | 6/2007 | Demmin et al. | 208/216 R |
| 2002/0040863 A1 | * | 4/2002 | Cody et al. | 208/18 |

* cited by examiner

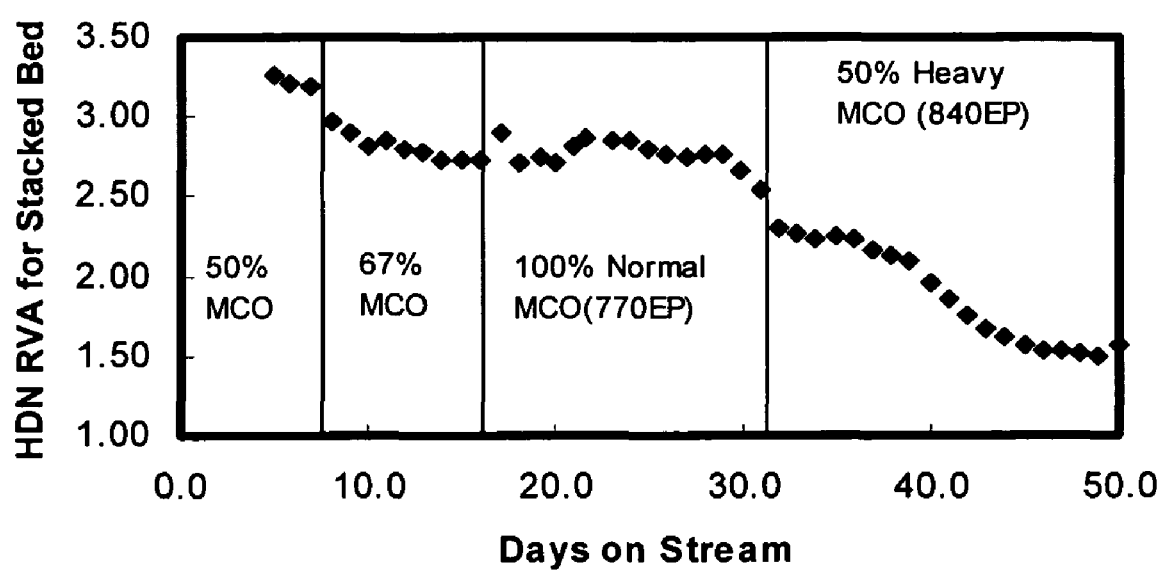
FIGURE

US 7,816,299 B2

HYDROTREATING CATALYST SYSTEM SUITABLE FOR USE IN HYDROTREATING HYDROCARBONACEOUS FEEDSTREAMS

CROSS-REFERENCE TO RELATED APPLICATIONS

This application is a Continuation-in-Part of U.S. patent application Ser. No. 10/949,513 filed Sep. 24, 2004, now abandoned, which claims benefit of United States Provisional Patent Application Ser. No. 60/518,739 filed Nov. 10, 2003 and Ser. No. 60/608,448 filed Sep. 9, 2004.

FIELD OF THE INVENTION

This invention relates to a hydrotreating catalyst system suitable for use in hydrotreating hydrocarbonaceous feedstreams. More particularly, the present invention is directed at a stacked bed catalyst system comprising at least one first catalyst selected from conventional hydrotreating catalyst having an average pore diameter of greater than about 10 nm and at least one second catalyst comprising a bulk metal hydrotreating catalyst comprised of at least one Group VIII non-noble metal and at least one Group VIB metal and optionally a binder material.

BACKGROUND OF THE INVENTION

Environmental and regulatory initiatives are requiring ever lower levels of both sulfur and aromatics in distillate fuels. For example, proposed sulfur limits for distillate fuels to be marketed in the European Union for the year 2005 is 50 wppm or less. There are also proposed limits that would require lower levels of total aromatics as well as lower levels of multi-ring aromatics found in distillate fuels and heavier hydrocarbon products. Further, the maximum allowable total aromatics level for CARB (California Air Resources Board) reference diesel and Swedish Class I diesel are 10 and 5 vol. %, respectively. Further, the CARB reference fuels allows no more than 1.4 vol. % polyaromatics (PNAs). Consequently, much work is presently being done in the hydrotreating art because of these proposed regulations.

Still further, with the advent of increased environmental concerns, the performance requirements for lubricating oil basestocks themselves have also increased. For example, the American Petroleum Institute (API) requirements for Group II basestocks include a saturates content of at least 90%, a sulfur content of 0.03 wt. % or less and a viscosity index (VI) between 80 and 120. Currently, there is a trend in the lube oil market to use Group II basestocks instead of Group I basestocks in order to meet the demand for higher quality basestocks that provide for increased fuel economy, reduced emissions, etc. For example, American Petroleum Institute (API) requirements for Group II basestocks include a saturates content of at least 90%, a sulfur content of 0.03 wt. % or less and a viscosity index (VI) between 80 and 120.

Thus, as the environmental and regulatory initiatives to increase, the search for new and different processes, catalysts, and catalyst systems that exhibit improved sulfur and nitrogen removal and aromatics saturation activity is a continuous, ongoing exercise. Therefore, there is a need to provide hydrocarbonaceous products that meet the demand for increased fuel economy, reduced emissions, etc.

SUMMARY OF THE INVENTION

The present invention is directed at a stacked bed catalyst system suitable for use in the hydrotreating of hydrocarbonaceous feedstocks. The catalyst system comprises:
  a) at least one first catalyst selected from conventional hydrotreating catalysts having an average pore diameter of greater than about 10 nm; and
  b) wherein said second catalyst is a bulk metal hydrotreating catalyst comprising about 30 to about 100 wt. % of at least one Group VIII non-noble metal and at least one Group VIB metal, based on the total weight of the catalyst particles, calculated as metal oxides; and ii) when less than 100 wt. % of said at least one Group VIII non-noble metal and Group VIB metal are present the remainder is a binder material, wherein particles of said second catalyst has a surface area of at least 10 $m^2/g$.

BRIEF DESCRIPTION OF THE FIGURE

The FIGURE is a plot of the relative volume activity of various catalysts and catalyst systems versus the days the respective catalysts and catalyst systems were on stream.

DETAILED DESCRIPTION OF THE INVENTION

It should be noted that the terms "feedstock" and "feedstream" as used herein are synonymous.

The present invention is directed at a stacked bed catalyst system suitable for use in the hydrotreating of hydrocarbonaceous feedstocks. The catalyst system comprises at least one first catalyst selected from conventional hydrotreating catalysts having an average pore diameter of greater than about 10 nm and at least one second catalyst selected from bulk metal hydrotreating catalysts. The stacked bed hydrotreating catalyst system is suitable for use in the hydrotreating of hydrocarbonaceous feedstocks.

As stated above, the present invention is a stacked bed catalyst system comprising at least a first and second hydrotreating catalyst. By "stacked bed" it is meant that the first catalyst appears in a separate catalyst bed, reactor, or reaction zone, and the second hydrotreating catalyst appears in a separate catalyst bed, reactor, or reaction zone downstream, in relation to the flow of the lubricating oil feedstock, from the first catalyst.

The first hydrotreating catalyst is a supported catalyst. Suitable hydrotreating catalysts for use as the first catalyst of the present catalyst system include any conventional hydrotreating catalyst. Conventional hydrotreating catalyst as used herein is meant to refer to those which are comprised of at least one Group VIII metal, preferably Fe, Co and Ni, more preferably Co and/or Ni, and most preferably Ni; and at least one Group VI metal, preferably Mo and W, more preferably Mo, on a high surface area support material, preferably alumina. The Group VIII metal is typically present in an amount ranging from about 2 to 20 wt. %, preferably from about 4 to 12%. The Group VI metal will typically be present in an amount ranging from about 5 to 50 wt. %, preferably from about 10 to 40 wt. %, and more preferably from about 20 to 30 wt. %. All metals weight percents are on support. By "on support" we mean that the percents are based on the weight of the support. For example, if the support were to weigh 100 g. then 20 wt. % Group VIII metal would mean that 20 g. of Group VIII metal was on the support.

However, not all conventional hydrotreating catalysts fitting the above-described criteria are suitable for use in the present invention. The inventors hereof have unexpectedly found that the average pore diameter of the first catalyst must have a specific size to be suitable for use herein. Thus, in the practice of the present invention, a conventional catalyst, as described above, but having an average pore diameter greater than 10 nm, as measured by water adsorption porosimetry, must be used as the first catalyst of the present stacked bed catalyst system. It is preferred that the average pore diameter of the first catalyst, i.e. the conventional hydrotreating catalyst, of the present stacked bed catalyst system be greater than 11 nm, more preferably greater than 12 nm.

The second hydrotreating catalyst is a bulk metal catalyst. By bulk metal, it is meant that the catalysts are unsupported wherein the bulk catalyst particles comprise about 30-100 wt. % of at least one Group VIII non-noble metal and at least one Group VIB metal, based on the total weight of the bulk catalyst particles, calculated as metal oxides and wherein the bulk catalyst particles have a surface area of at least 10 m$^2$/g. It is furthermore preferred that the bulk metal hydrotreating catalysts used herein comprise about 50 to about 100 wt. %, and even more preferably about 70 to about 100 wt. %, of at least one Group VIII non-noble metal and at least one Group VIB metal, based on the total weight of the particles, calculated as metal oxides. The amount of Group VIB and Group VIII non-noble metals can easily be determined VIB TEM-EDX. In the case where less than 100 wt. % of the second hydrotreating catalyst is the Group VIII or Group VIB metal, the reminder can be selected from the group consisting of binders, or transition metal additives. A binder material is preferred.

The binder material can be any material conventionally used as a binder in hydroprocessing catalysis. Non-limiting examples of such materials that can be used in the practice of the present invention include silica, silica-alumina, such as conventional silica-alumina, silica-coated alumina and alumina-coated silica, and alumina, such as (pseudo)boehmite, gibbsite, titania, titania-coated alumina, zirconia, cationic clays or anionic clays such as saponite, bentonite, kaolin, sepiolite or hydrotalcite or mixtures thereof. Preferred binders are silica, silica-alumina, titania, titania-coated alumina, zirconia, bentonite, or mixtures thereof.

The Group VIII/Group VIB metal particles can be embedded in the binder or vice versa, which binder or particles function as a glue to hold the particles or binder together. Preferably, the particles are homogeneously distributed within the binder. The presence of the binder generally leads to an increased in mechanical strength of the final catalyst composition. Generally, the catalyst composition has a mechanical strength, expressed as side crush strength, of at least about 1 lbs/mm and preferably of at least about 3 lbs/mm (measured on extrudates with a diameter of 1-2 mm).

Suitable additional transition metals that can be used in the practice of the present invention include rhenium, manganese, ruthenium, rhodium, iridium, chrominum, vanadium, iron, platinum, palladium, niobium, titanium, zirconium, cobalt, nickel, molybdenum or tungsten. These metal compounds can be added during any catalyst manufacturing stage prior to the catalyst shaping step. Apart from adding these metals during catalyst preparation, it is also within the scope of this invention that these metals be composited with the final catalyst composition. Thus, it is also possible to impregnate the final catalyst composition with an impregnation solution comprising any of these metals.

If alumina is applied as the binder, the surface area of the alumina will range from about 50 to about 600 m$^2$/g, preferably from about 100 to about 450 m$^2$/g, as measured by the B.E.T. method. The pore volume of the alumina is preferably in the range of about 0.1 to about 1.5 ml/g, as measured by nitrogen adsorption. Before the characterization of the alumina, it is thermally treated at 600

Bulk catalyst compositions comprising one Group VIII non-noble metal and two Group VIB metals are preferred. It has been found that in this case, the bulk catalyst particles are sintering-resistant. Thus the active surface area of the bulk catalyst particles is maintained during use. The molar ratio of Group VIB to Group VIII non-noble metals ranges generally from 10:1-1:10 and preferably from 3:1-1:3. In the case of a core-shell structured particle, these ratios of course apply to the metals contained in the shell. If more than one Group VIB metal is contained in the bulk catalyst particles, the ratio of the different Group VIB metals is generally not critical. The same holds when more than one Group VIII non-noble metal is applied. In the case where molybdenum and tungsten are present as Group VIB metals, the molybenum:tungsten ratio preferably lies in the range of 9:1-1:9. Preferably the Group VIII non-noble metal comprises nickel and/or cobalt. It is further preferred that the Group VIB metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant. Thus, the active surface area of the precipitate is remained during use. The metals are preferably present as oxidic compounds of the corresponding metals, or if the catalyst composition has been sulfided, sulfidic compounds of the corresponding metals.

It is also preferred that the bulk metal hydrotreating catalysts used herein have a surface area of at least about 50 m$^2$/g and more preferably of at least about 100 m$^2$/g. It is also desired that the pore size distribution of the bulk metal hydrotreating catalysts be approximately the same as the one of conventional hydrotreating catalysts. More in particular, these bulk metal hydrotreating catalysts have preferably a pore volume of about 0.05-5 ml/g, more preferably of about 0.1-4 ml/g, still more preferably of about 0.1-3 ml/g and most preferably about 0.1-2 ml/g determined by nitrogen adsorption. Preferably, pores smaller than 1 nm are not present. Furthermore these bulk metal hydrotreating catalysts preferably have a median diameter of at least about 50 nm, more preferably at least about 100 nm, and preferably not more than about 5000 µm and more preferably not more than about 3000 µm. Even more preferably, the median particle diameter lies in the range of about 0.1-50 µm and most preferably in the range of about 0.5-50 µm.

The reaction stage containing the stacked bed hydrotreating catalyst system used in the present invention can be comprised of one or more fixed bed reactors or reaction zones each of which can comprise one or more catalyst beds of the same or different catalyst. Although other types of catalyst beds can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed since some olefin saturation can take place, and olefin saturation and the desulfurization reaction are generally exothermic. A portion of the heat generated during hydrotreating can be recovered. Where this heat recovery option is not available, conventional cooling may be performed through cooling utilities such as cooling water or air, or through use of a hydrogen quench stream. In this manner, optimum reaction temperatures can be more easily maintained.

The stacked bed catalyst system of the present invention comprises about 5-95 vol. % of the first catalyst with the second catalyst comprising the remainder, preferably about 40-60 vol. %, more preferably about 5 to about 50 vol. %. Thus, if the catalyst system comprises 50 vol. % of the first catalyst, the second catalyst will comprise 50 vol. % also.

As stated above, the present catalyst system is suitable for use in the hydrotreating of hydrocarbonaceous feedstreams. By hydrocarbonaceous feedstream, it is meant a primarily hydrocarbon material obtained or derived from crude petroleum oil, from tar sands, from coal liquefaction, shale oil and hydrocarbon synthesis. Thus, hydrocarbonaceous feedstreams suitable for treatment with the present invention include those feedstreams boiling from the naphtha boiling range to heavy feedstocks, such as gas oils and resids, and also those derived from Fischer-Tropsch processes. Typically, the boiling range will be from about 40° C. to about 1000° C. Non-limiting examples of suitable feedstreams include vacuum gas oils; distillates including naphtha, diesel, kerosene, and jet fuel; heavy gas oils, raffinates, lube oils, etc.

Hydrocarbonaceous boiling range feedstreams suitable for treatment with the present invention include, among other things, nitrogen and sulfur contaminants. Typically, the nitrogen content of such streams is about 50 to about 1000 wppm nitrogen, preferably about 75 to about 800 wppm nitrogen, and more preferably about 100 to about 700 wppm nitrogen. The nitrogen appears as both basic and non-basic nitrogen species. Non-limiting examples of basic nitrogen species may include quinolines and substituted quinolines, and non-limiting examples of non-basic nitrogen species may include carbazoles and substituted carbazoles. The sulfur content of the hydrocarbonaceous boiling range feedstream will generally range from about 50 wppm to about 7000 wppm, more typically from about 100 wppm to about 5000 wppm, and most typically from about 100 to about 3000 wppm. The sulfur will usually be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene, tetrahydrothiophene, benzothiophene and their higher homologs and analogs. The hydrocarbonaceous feedstreams suitable for use herein also contain aromatics, which are typically present in an amount ranging from about 0.05 wt. %, to about 2.5 wt. %, based on the hydrocarbonaceous boiling range feedstream.

Preferred feedstocks suitable for treatment with the present invention are wax-containing feeds that boil in the lubricating oil range, typically having a 10% distillation point greater than 650° F. (343° C.) and an endpoint greater than 800° F. (426° C.), measured by ASTM D 86 or ASTM 2887. These feedstocks can be derived from mineral sources, synthetic sources, or a mixture of the two. Non-limiting examples of suitable lubricating oil feedstocks include those derived from sources such as oils derived from solvent refining processes such as raffinates, partially solvent dewaxed oils, deasphalted oils, distillates, vacuum gas oils, coker gas oils, slack waxes, foots oils and the like, dewaxed oils, automatic transmission fluid feedstocks, and Fischer-Tropsch waxes. Automatic transmission fluid ("ATF") feedstocks are lube oil feedstocks having an initial boiling point between about 200° C. and 275° C., and a 10% distillation point greater than about 300° C. ATF feedstocks are typically 75-110N feedstocks.

These feedstocks may also have high contents of nitrogen- and sulfur-contaminants. Feeds containing up to about 0.2 wt. % of nitrogen, based on feed and up to about 3.0 wt. % of sulfur can be processed in the present process. Feeds having a high wax content typically have high viscosity indexes of up to about 200 or more. Sulfur and nitrogen contents may be measured by standard ASTM methods D5453 and D4629, respectively.

As stated above, the present invention is suitable in hydrotreating processes. It should be noted that the term "hydrotreating" as used herein refers to processes wherein a hydrogen-containing treat gas is used in the presence of a suitable catalyst that is primarily active for the removal of heteroatoms, such as sulfur, and nitrogen, and saturation of aromatics. If the present invention is employed in a hydrotreating process, a hydrocarbonaceous feedstream is contacted with the stacked bed catalyst system in a reaction stage operated under effective hydrotreating conditions. By effective hydrotreating conditions, it is meant those conditions effective at removing at least a portion of the sulfur contaminants from the hydrocarbonaceous feedstream. Effective hydrotreating conditions generally include temperatures of from about 150 to 400° C., a hydrogen partial pressure of from about 1480 to 20786 kPa (200 to 3000 psig), a space velocity of from about 0.1 to 10 liquid hourly space velocity (LHSV), and a hydrogen to feed ratio of from about 89 to 1780 $m^3/m^3$ (500 to 10000 scf/B).

The contacting of the hydrocarbonaceous feedstock with the stacked bed hydrotreating catalyst system produces a hydrotreated effluent comprising at least a gaseous product and a hydrotreated hydrocarbonaceous feedstock. The hydrotreated effluent is stripped to remove at least a portion of the gaseous product from the hydrotreated effluent. The means used to strip the hydrotreated effluent can be selected from any stripping method, process, or means known can be used. Non-limiting examples of suitable stripping methods, means, and processes include flash drums, fractionators, knock-out drums, steam stripping, etc.

The above description is directed to preferred embodiments of the present invention. Those skilled in the art will recognize that other embodiments that are equally effective could be devised for carrying out the spirit of this invention.

The following examples will illustrate the improved effectiveness of the present invention, but is not meant to limit the present invention in any fashion.

EXAMPLES

Example 1

A medium vacuum gas oil having the properties outlined in Table 1 was processed in an isothermal pilot plant over three catalysts systems at 1200 psig hydrogen partial pressure. The catalyst systems and operating conditions are given in Table 2. Catalyst B is a conventional hydrotreating catalyst having about 4.5 wt. % Group VI metal, about 23 wt. % Group VIII metal on an alumina support and has an average pore size of 14.0 nm. The bulk metal hydrotreating catalyst was a commercial bulk metal hydrotreating catalyst marketed under the name Nebula by Akzo-Nobel.

In the Examples, all the catalyst systems were lined out at about 50 days on stream. A first order kinetic model with an activation energy of 31,000 cal/gmol was used to compare volume activities between the catalysts.

TABLE 1

|  | Medium Vacuum Gas Oil |
| --- | --- |
| Density at 70° C. (g/cc) | 0.88 |
| Nitrogen (wppm) | 700 |

TABLE 1-continued

|  | Medium Vacuum Gas Oil |
|---|---|
| Sulfur (wt. %) | 2.6 |
| GCD 5 WT % Boiling Point (° C.) | 334 |
| GCD 50 WT % Boiling Point (° C.) | 441 |
| GCD 95 WT % Boiling Point (° C.) | 531 |

TABLE 2

| Catalyst System | 100 vol. % Catalyst B | 100 vol. % Nebula 1 | 50 vol. % Catalyst B followed by 50 vol. % Nebula 1 |
|---|---|---|---|
| Average Catalyst Temperature (° C.) | 370 | 380 | 370 |
| Liquid Hourly Space Velocity (hr$^{-1}$) | 2 | 1 | 1 |
| Stripped reactor Effluent Nitrogen Content (wppm) | 227 | 17 | 34 |
| Nitrogen Removal Relative Volume Activity | 1 | 1.18 | 1.34 |

The Nitrogen Removal Relative Volume Activity ("RVA") for each catalyst system was calculated by simple first order kinetic modeling. As shown in Table 2, the 50/50 vol. % stacked bed catalyst system, with the large average pore size Catalyst B upstream of the bulk metal catalyst, showed higher nitrogen removal activity than either of the single catalyst systems demonstrated on their own.

Example 2

The hydrotreating ability of different stacked beds of Catalyst B and Nebula were analyzed by hydrotreating different feedstreams over the stacked beds in the in two parallel reactor trains of the same isothermal pilot plant unit used in Example 1 above. The feedstreams used were Medium Cycle Oils ("MCO") from an FCC unit and blends of the MCO with a virgin feedstock were tested in two parallel reactor trains. The feed properties are described in Table 3, below.

In this Example, one reactor train consisted entirely of a conventional NiMo on Alumina hydrotreating catalyst, Catalyst C, with an average pore diameter of 7.5 nm. The other reactor train contained a stacked bed system with 75-vol. % of Catalyst C followed by 25-vol. % of Catalyst A, a bulk multimetallic sulfide catalyst having an average pore diameter of 5.5 nm.

The separate reactors in both trains were immersed in a fluidized sandbath for efficient heat transfer. Thus, the temperature of the first 75-vol. % of Catalyst C was at the same temperature whether it was in train 1 or 2. Likewise, the last 25-vol. % of Catalyst C in train 1 was at the same temperature as the last 25-vol. % of Catalyst A in train 2. Therefore, In Example 2, each of the two reactor trains was divided into two separate reactor vessels where the temperature of the first 75-volume % containing 75 vol. % of the catalyst loading of that reactor could be independently controlled from the last 25-volume % of catalyst.

The operating conditions for the two trains were 1350 psig H$_2$, liquid hourly space velocities ("LHSV") of 1.4 vol./hr/vol., and 5500-6300 SCF/B of hydrogen. The temperature schedule for both trains is described in Table 4 below.

TABLE 3

|  | FEED | | | |
|---|---|---|---|---|
|  | 50% Normal FCC MCO | 67% Normal FCC MCO | 100% Normal FCC MCO | 100% Heavy FCC MCO |
| API Gravity | 18.1 | 15.0 | 9.5 | 7.0 |
| Hydrogen, wt. % | 10.65 | 10.04 | 8.77 | 8.61 |
| Sulfur, wt. % | 3.23 | 3.53 | 4.28 | 4.40 |
| Nitrogen, ppm | 959 | 1153 | 1485 | 1573 |
| Aromatics-Mono, wt. % | — | — | 12.0 | 8.8 |
| Aromatics-Di, wt. % | — | — | 43.9 | 41.7 |
| Aromatics-Poly, wt. % | — | — | 22.4 | 30.7 |
| Distillation, D2887 GCD | | | | |
| 10 | 498 | 493 | 485 | 493 |
| 50 | 627 | 625 | 618 | 642 |
| 90 | 703 | 705 | 706 | 749 |
| 95 | 726 | 721 | 724 | 777 |

TABLE 4

| Days on Oil | Feedstock | 75%/25% Temperatures, ° F. |
|---|---|---|
| 4-6 | 50% FCC MCO | 585/650 |
| 7-15 | 67% FCC MCO | 585/650 |
| 16-30 | 100% FCC MCO | 585-610/650-675 |
| 31-50 | 100% Heavy FCC MCO | 610-635/675-700 |

The relative HDN volume activity of the stacked bed Catalyst C/Catalyst A compared to Catalyst A is shown in the figure below. Note that for the 50%, 67% and 100% FCC MCO feeds the stacked bed system with only 25-volume % of Catalyst A shows a stable activity advantage of about 275%.

As shown in the FIGURE, when the 100% Heavy FCC MCO was used as the feed note the activity advantage for the stacked bed catalyst system containing begins to decrease from about 275% to about 225% and then was subsequently reduced over about 20 days to slightly less than 150%.

Example 3

In this Example, a stacked bed catalyst system containing 75 vol. % of Catalyst B and 25 vol. % Nebula, both as described above, was used to hydrotreat a light cycle cat oil feed ("Feed A") and a heavier medium cycle cat oil feed ("Feed B") as described in Table 5 below. Example 2 was conducted in the same two reactor train pilot plant unit as described in Example 2 above. The operating conditions for the two trains were 1200 psig H$_2$, liquid hourly space velocities of 2 vol./hr/vol., and 5000 SCF/B of hydrogen.

The reactor effluents were stripped with nitrogen in an oven at 100° C. to remove substantially all of the gaseous reaction products. The nitrogen content of the liquid reactor effluent was then analyzed by ASTM 4629. The temperature schedules for both trains along with the results of this example are described in Table 5 below.

TABLE 5

| FEED | Feed A | Feed B |
| --- | --- | --- |
| API Gravity | 0.973 | 0.9 |
| Sulfur, wt. % | 2.6 | 2.50 |
| Nitrogen, ppm | 713 | 742 |
| Distillation, D2887 GCD | | |
| 5 | 427 | 448 |
| 50 | 551 | 590 |
| 95 | 707 | 755 |
| EP | 764 | 823 |
| Catalyst B Temperature | 570 | 617 |
| Nebula Temperature | 645 | 692 |
| Stripped Reactor Effluent Nitrogen Content | 2 | 7 |
| Nitrogen Removal Relative Volume Activity | 1.75 | 1.75 |

As can be seen in Table 5, when a conventional catalyst having an average pore diameter of 14 nm was used in the first 75 vol. % of the reactor, the Nitrogen Removal Relative Volume Activity ("RVA") for the catalyst system remained constant when the heavier feed was used. In comparing the results of Example 3 to those obtained in Example 2, one can see that when a catalyst having a pore volume of 7.5 nm preceded the bulk metal catalyst, the RVA of the catalyst system decreased. However, in Example 3, the heavier feed did not negatively impact the RVA of the catalyst system.

What is claimed is:

1. A stacked bed catalyst system comprising:
   a) at least one first catalyst selected from conventional hydrotreating catalysts having an average pore diameter of greater than about 10 nm; and
   b) a second catalyst which is a bulk metal hydrotreating catalyst consisting essentially of about 30 to about 100 wt. % of at least one Group VIII non-noble metal and at least one Group VIB metal, based on the total weight of the bulk catalyst particles, calculated as metal oxides; and) when less than 100 wt. % of said at least one Group VIII non-noble metal and Group VIB metal are present the remainder is a binder material, wherein particles of said second catalyst have a surface area of at least 10 $m^2/g$.

2. The stacked catalyst system according to claim 1 wherein said at least one first catalyst is comprised of about 2 to 20 wt. % of at least one Group VIII metal, and about 5 to 50 wt. % of at least one Group VI metal on a high surface area support material.

3. The stacked bed catalyst system according to claim 2 wherein said Group VIII metal is selected from the group consisting of Co and Ni, said Group VIB metal is selected from the group consisting of Mo and W, and said high surface area support material is selected from the group consisting of silica, alumina, and mixtures thereof.

4. The stacked bed catalyst system according to claim 1 wherein said binder material is selected from the group consisting of silica, silica-alumina, silica-coated alumina, alumina-coated silica, and alumina, titania, titania-coated alumina, zirconia, cationic clays, anionic clays bentonite, and mixtures thereof.

5. The stacked bed catalyst system according to claim 4 wherein the binder material is selected from the group consisting of silica, silica-alumina, titania, titania-coated alumina, zirconia, bentonite, and mixtures thereof.

6. The stacked bed catalyst system according to claim 1 wherein said bulk metal hydrotreating catalyst comprises one Group VIII non-noble metal and two Group VIB metals, wherein the molar ratio of Group VIB to Group VIII non-noble metals ranges from 10:1-1:10.

7. The stacked bed catalyst system according to claim 1 wherein the bulk metal hydrotreating catalyst has a surface area of at least 50 $m^2/g$, a pore size volume of about 0.05 to about 5 ml/g, and a median diameter of at least 50 nm.

8. The stacked bed catalyst system according to claim 1 which comprises about 5-95 vol. % of the first catalyst with the second catalyst comprising the remainder.

9. The stacked bed catalyst system according to claim 1 wherein said first catalyst has an average pore diameter of greater than 11 nm.

10. The stacked bed catalyst system according to claim 1 wherein said first catalyst has an average pore diameter of greater than 12 nm.

11. The stacked bed catalyst system according to claim 1 which comprises about 40-60 vol. % of the first catalyst with the second catalyst comprising the remainder.

12. The stacked bed catalyst system according to claim 1 which comprises about 5-50 vol. % of the first catalyst with the second catalyst comprising the remainder.

* * * * *